（12）United States Patent
Brochard et al.

(10) Patent No.: US 12,486,698 B2
(45) Date of Patent: Dec. 2, 2025

(54) LOCKING MECHANISM FOR AT LEAST ONE MOVABLE ELEMENT SITUATED IN A FIRST ZONE AND COMPRISING A COMPONENT THAT CAN BE ADJUSTED FROM A SECOND ZONE, AND AIRCRAFT COMPRISING AT LEAST ONE SUCH LOCKING MECHANISM

(71) Applicant: Airbus Operations SAS, Toulouse (FR)

(72) Inventors: Wolfgang Brochard, Toulouse (FR); Laurent Cazeaux, Toulouse (FR); Benjamin Vignoboul, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 290 days.

(21) Appl. No.: 18/172,887

(22) Filed: Feb. 22, 2023

(65) Prior Publication Data

US 2023/0265694 A1  Aug. 24, 2023

(30) Foreign Application Priority Data

Feb. 24, 2022 (FR) ..................................... 2201625

(51) Int. Cl.
*E05C 19/14* (2006.01)
*B64D 29/06* (2006.01)
(Continued)

(52) U.S. Cl.
CPC .............. *E05C 1/006* (2013.01); *B64D 29/06* (2013.01); *E05C 19/14* (2013.01)

(58) Field of Classification Search
CPC . Y10T 292/216; Y10T 292/705; E05C 19/14; E05B 15/0046
See application file for complete search history.

(56) References Cited

U.S. PATENT DOCUMENTS 2,767,007 A * 10/1956 Burke ................. E05B 65/0046
  292/216
4,158,463 A *  6/1979 Henrichs ............... E05B 15/025
  292/341.18
(Continued)

FOREIGN PATENT DOCUMENTS

FR  2611375 A1  9/1988

OTHER PUBLICATIONS

French Search Report dated Oct. 11, 2022; priority document.

*Primary Examiner* — Carlos Lugo
(74) *Attorney, Agent, or Firm* — Greer, Burns & Crain, Ltd.

(57) ABSTRACT

A locking mechanism situated in an inner zone and comprising at least one component that is adjustable in a longitudinal direction and that is linked to a support by a link having a rod secured to the adjustable component. The link includes a guideway link, linking the rod and the support, and an adjustment system. The adjustment system comprises a pivoting control pivoting on itself and having a first end accessible from an outer zone, an intermediate piece configured to pivot on itself, an angle transmission converting a pivoting movement of the pivoting control into a pivoting movement of the intermediate piece, and a helical link converting a pivoting movement of the intermediate piece into a translational movement of the rod. The locking mechanism allows for adjustment from the outer zone. An aircraft comprising at least one such locking mechanism is also provided.

8 Claims, 5 Drawing Sheets

(51) Int. Cl.
*E05C 1/00* (2006.01)
*B64D 29/00* (2006.01)

(56) References Cited

U.S. PATENT DOCUMENTS

| | | | |
|---|---|---|---|
| 4,183,564 A | | 1/1980 | Poe |
| 4,538,843 A | * | 9/1985 | Harris .................... E05C 19/145 |
| | | | 292/DIG. 31 |
| 4,798,408 A | * | 1/1989 | Harmon ................ E05B 15/025 |
| | | | 292/341.18 |
| 4,852,923 A | | 8/1989 | Harmon et al. |
| 4,906,037 A | | 3/1990 | Stammreich et al. |
| 5,016,931 A | | 5/1991 | Jackson |
| 7,261,356 B1 | * | 8/2007 | Taylor .................... B60P 1/435 |
| | | | 49/386 |
| 7,270,029 B1 | * | 9/2007 | Papanikolaou ......... E05B 85/01 |
| | | | 292/201 |
| 7,926,385 B2 | * | 4/2011 | Papanikolaou ......... E05B 79/20 |
| | | | 292/201 |
| 8,113,551 B2 | * | 2/2012 | Baic .................... E05B 15/0006 |
| | | | 292/DIG. 31 |
| 9,273,488 B1 | | 3/2016 | Yu |
| 11,866,189 B2 | * | 1/2024 | Artin .................... E05B 15/022 |

* cited by examiner

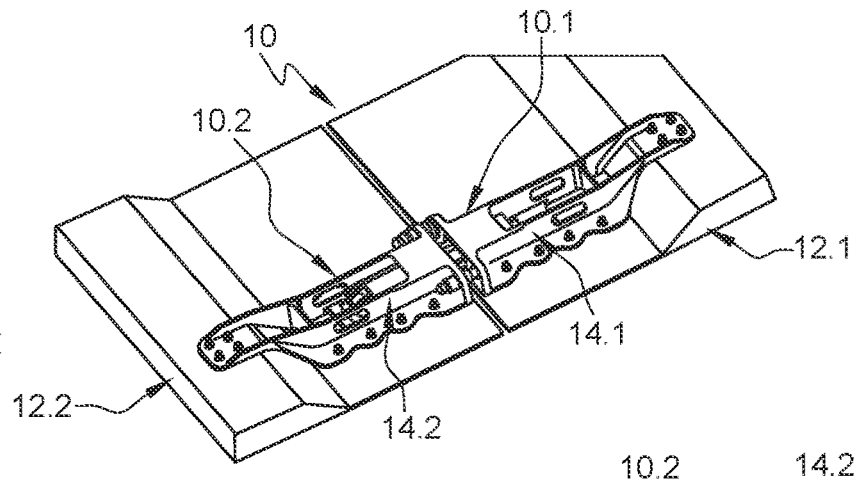
Fig. 1
Prior Art
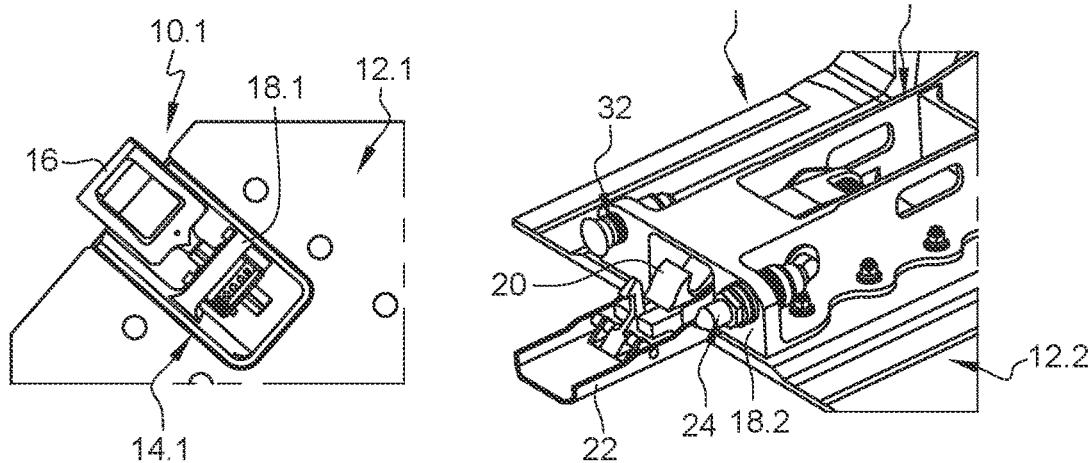
Fig. 2
Prior Art
Fig. 3
Prior Art
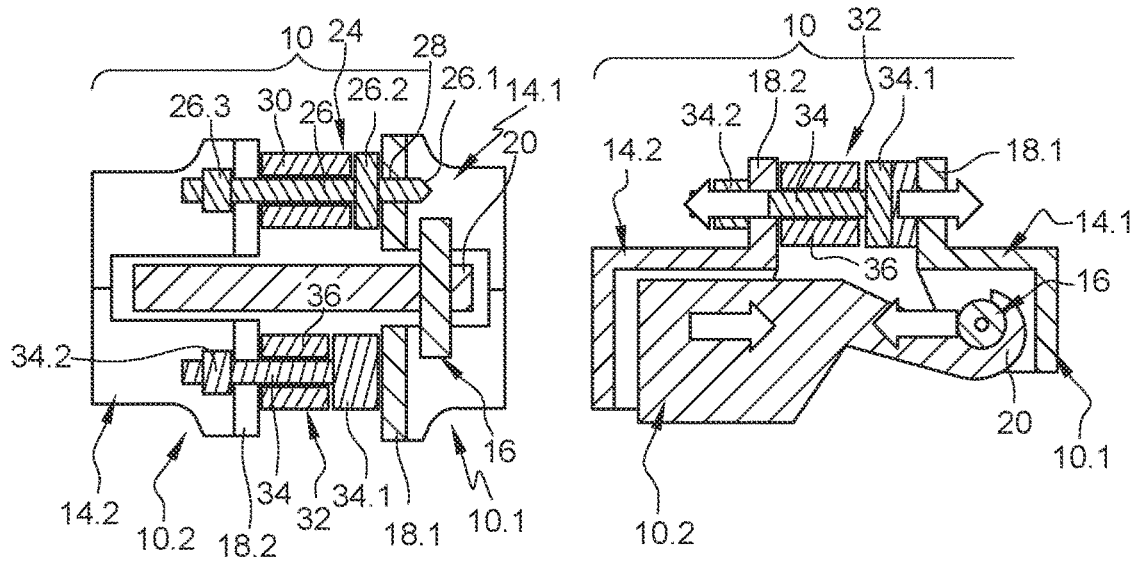
Fig. 4
Prior Art
Fig. 5
Prior Art

LOCKING MECHANISM FOR AT LEAST ONE MOVABLE ELEMENT SITUATED IN A FIRST ZONE AND COMPRISING A COMPONENT THAT CAN BE ADJUSTED FROM A SECOND ZONE, AND AIRCRAFT COMPRISING AT LEAST ONE SUCH LOCKING MECHANISM

CROSS-REFERENCES TO RELATED APPLICATIONS

This application claims the benefit of the French patent application No. 2201625 filed on Feb. 24, 2022, the entire disclosures of which are incorporated herein by way of reference.

FIELD OF THE INVENTION

The present application relates to a locking mechanism for at least one movable element situated in a first zone and comprising at least one component that can be adjusted from a second zone, and to an aircraft comprising at least one such locking mechanism.

BACKGROUND OF THE INVENTION

According to one embodiment, the nacelle of an aircraft comprises two cowls, positioned on either side of a vertical median plane, movable between a closed position and an open position in which they allow access to the interior of the nacelle. When the cowls are in closed position, their bottom edges are attached to one another and linked by locking mechanisms that make it possible to keep the cowls in closed position.

As illustrated in FIG. 1, each locking mechanism 10 comprises a first part 10.1 secured to a first cowl 12.1 and a second part 10.2 secured to a second cowl 12.2, the first and second parts 10.1, 10.2 being positioned against the inner face of the cowls 12.1, 12.2.

According to an embodiment visible in FIGS. 2, 4 and 5, the first part 10.1 comprises a first support 14.1 fixed onto the first cowl 12.1 and an anchoring point 16 linked to the first support 14.1. According to one configuration, the anchoring point 16 takes the form of a loop. The first support 14.1 comprises a first transverse wall 18.1 close to the second cowl 12.2.

According to an embodiment visible in FIGS. 3 to 5, the second part 10.2 comprises a second support 14.2 fixed onto the second cowl 12.2, a hook 20 that is articulated with respect to the second support 14.2 and a handle 22 configured to manipulate the hook 20. The second support 14.2 has a second transverse wall 18.2 close to the first cowl 12.1 that is parallel to the first transverse wall 18.1.

The locking mechanism 10 also comprises a centering system 24 configured to position the first and second parts 10.1, 10.2 with respect to one another. According to one configuration, the centering system 24 comprises a first cylindrical rod 26 supported by the second transverse wall 18.2 and an orifice 28 provided on the first transverse wall 18.1 and configured to receive the first cylindrical rod 26. The cylindrical rod 26 has a pointed first end 26.1 configured to be housed in the orifice 28 and a collar 26.2 configured to be in contact with the first transverse wall 18.1. The centering system 24 comprises a first adjustment sleeve 30 fitted onto the first cylindrical rod 26 and inserted between the second transverse wall 18.2 and the collar 26.2.

The locking mechanism 10 also comprises a shim system 32 configured to maintain a given distance between the first and second transverse walls 18.1, 18.2 when the locking mechanism is in the locked state. According to one configuration, the shim system 32 comprises a second cylindrical rod 34, supported by the second transverse wall 18.2. The second cylindrical rod 34 has, at its first end, a cylindrical head 34.1 configured to bear against the first transverse wall 18.1. The shim system 32 comprises a second adjustment sleeve 36 fitted onto the second cylindrical rod 34 and inserted between the second transverse wall 18.2 and the cylindrical head 34.1.

For the locking mechanism 10 to function correctly, it is necessary for the anchoring point 16 to be correctly positioned with respect to the first support 14.1 and for the cylindrical head 34.1 of the shim system 32, and the collar 26.2 of the centering system 24, to be correctly positioned with respect to the second transverse wall 18.2 of the second support 14.2.

Since the geometries and dimensions of the nacelles and of the cowls are vary from one aircraft to another, the lengths of the adjustment sleeves 30, 36 differ from one aircraft to another. Consequently, for each aircraft, the lengths of the adjustment sleeves 30, 36 are adjusted by checking whether the locking mechanism 10 is functioning correctly. Since the adjustment sleeves 30, 36 are only accessible from the interior of the nacelle when the cowls are in open position and correct functioning of the locking mechanism 10 can only be checked when the cowls are in closed position, adjustment of the locking mechanism 10 is a relatively lengthy and tedious process because the cowls must be opened to modify the adjustment sleeves 30, 36 then reclosed to check whether the locking mechanism 10 is functioning correctly, this succession of openings and closures being carried out until the locking mechanism 10 functions correctly.

The present invention aims to remedy all or some of the drawbacks of the prior art.

SUMMARY OF THE INVENTION

To this end, an object of the invention is a locking mechanism comprising first and second parts and configured to occupy a locked state in which the first and second parts are kept close to one another and an unlocked state in which the first and second parts can be separated from one another in a longitudinal direction. The first part is configured to be fixed onto a first element comprising a wall separating a first zone and a second zone, and the first part is situated in the first zone and comprising a first support fixed against the wall in operation. The first part comprises at least one adjustable component having a positioning that can be adjusted in the longitudinal direction and that is linked to the first support by a link comprising a rod comprising a first segment secured to the adjustable component.

According to an aspect of the invention, the link comprises a guideway link configured to allow at least the first segment of the rod to be translated with respect to the first support in the longitudinal direction.

According to an aspect of the invention, the locking mechanism comprises an adjustment system having a pivoting control configured to pivot on itself, passing through the wall and having a first end accessible from the second zone in operation, an intermediate piece configured to pivot on itself, an angle transmission configured to convert a pivoting movement of the pivoting control into a pivoting movement of the intermediate piece, a helical link configured to convert a pivoting movement of the intermediate piece into a translational movement of at least the first segment of the rod, and an anti-return system for blocking rotation of the pivoting control in at least one direction of rotation.

According to an aspect of the invention, the positioning of the adjustable component can be adjusted from the second zone. In the case of the cowls of an aircraft nacelle, it is no longer necessary to alternate the openings and closures of the cowls to adjust the positioning of the anchoring point, of the centering system and/or of the shim system. This adjustment is thus greatly simplified.

According to a first embodiment, the intermediate piece is a first ring positioned around the rod and comprising an inner cylindrical surface. In addition, the helical link comprises at least one tapping on the inner cylindrical surface of the first ring and at least one threading on the first rod, the tapping and the threading being configured to cooperate in order to obtain the helical link, the angle transmission configured to convert the pivoting movement of the pivoting control into a pivoting movement of the first ring.

According to a second embodiment, the rod comprises a second segment coaxial to the first segment. In addition, the intermediate piece comprises the second segment of the first rod, the angle transmission configured to convert the pivoting movement of the pivoting control into a pivoting movement of the second segment, the helical link configured to convert the pivoting movement of the second segment into a translational movement of the first segment of the rod.

According to another feature, the first part comprises a sliding pivot link linking the first rod and the first support and a system for immobilizing rotation of the first rod.

According to another feature, the anti-return system comprises a ratchet wheel secured to the pivoting control, a ratchet linked to the first support by a pivoting link, an elastic return element configured to push the ratchet against the ratchet wheel and a control cam configured to separate the ratchet from the ratchet wheel against the elastic return element.

According to another feature, the pivoting control comprises a first control axle having a first end accessible from the second zone and a lateral face provided, at the first end, with at least one flat to pivot the first control axle on itself. In addition, the anti-return system comprises a rotation blocking plate comprising a through-orifice having a section identical to that of the first end and cooperating therewith, the rotation blocking plate being linked to the first support.

According to another feature, the locking mechanism comprises several adjustable components from among an anchoring point configured to cooperate with a hook, at least one centering system configured to allow the first and second parts to be positioned with respect to one another and at least one shim system configured to make it possible to maintain a given distance between the first and second parts in the locked state.

Another subject of the invention is an aircraft comprising at least one movable element comprising a wall separating a first zone and a second zone and having a first face oriented towards the first zone and a second face oriented towards the second zone and at least one locking mechanism, according to one of the preceding features, positioned in the first zone and configured to keep the movable element in a given position in the locked state.

According to another feature, the second face of the wall comprises, for each pivoting control, a hollowed form configured to house a part of the pivoting control accessible from the second zone, each pivoting control comprising an end face substantially coplanar with the second face of the wall.

According to another feature, the locking mechanism comprises, for each hollowed form, a lining plate dimensioned to fill the hollowed form and a rapid attachment system for linking the lining plate to the wall or to a support of the locking mechanism, the lining plate having a face flush with the second face of the wall when the lining plate is linked to the wall or to the support.

BRIEF DESCRIPTION OF THE DRAWINGS

Other features and advantages are set out in the description of the invention, given purely by way of example and with reference to the attached drawings, in which:

FIG. 1 is a perspective view of a locking mechanism illustrating an embodiment of the prior art, FIG. 2 is a perspective view of a first part of the locking mechanism visible in FIG. 1, FIG. 3 is a perspective view of a second part of the locking mechanism visible in FIG. 1, FIG. 4 is a top-view schematic representation of a locking mechanism illustrating an embodiment of the prior art, FIG. 5 is a schematic representation in longitudinal cross-section of a locking mechanism illustrating an embodiment of the prior art.

DETAILED DESCRIPTION OF THE PREFERRED EMBODIMENTS

Figure 14:
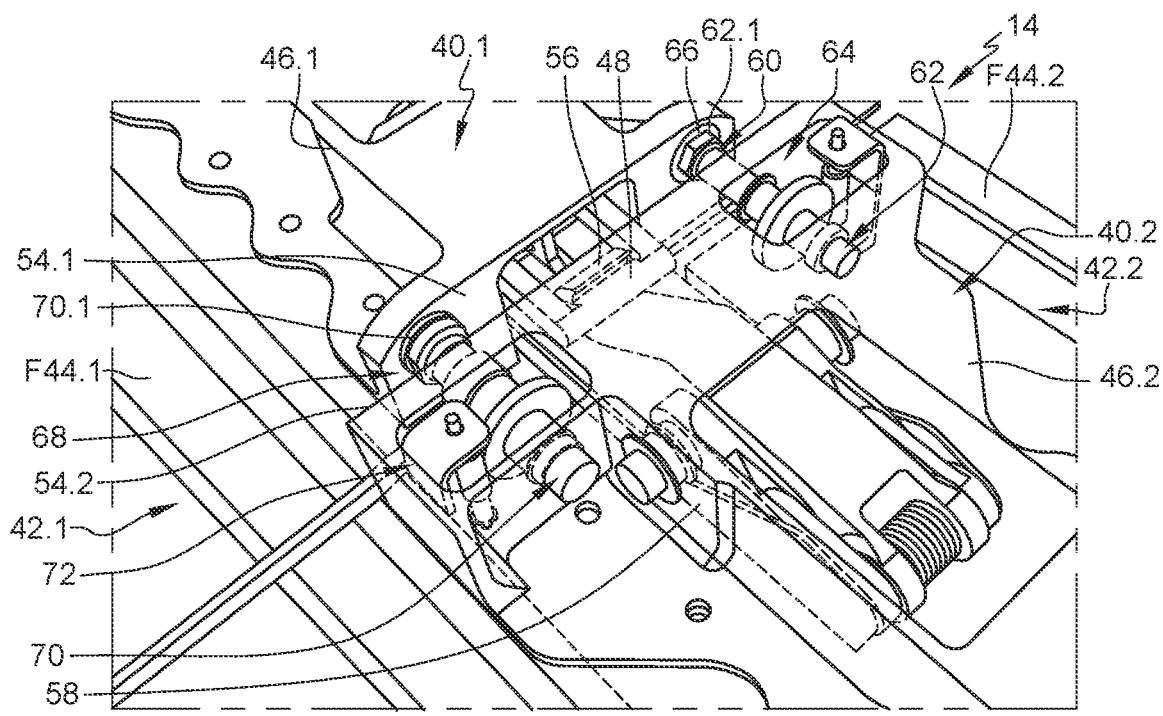
FIG. 14 is a perspective view of a locking mechanism illustrating an embodiment of the invention.
Figure 15:
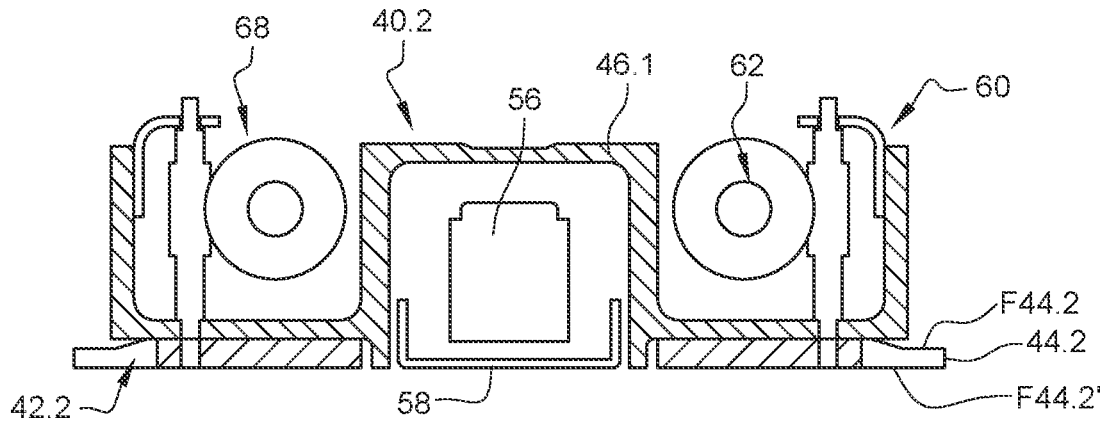
FIG. 15 is a transverse cross-section partially representing adjustment systems of a centering system and of a shim system illustrating an embodiment of the invention.

According to an embodiment shown in FIG. 14, a locking mechanism 40 comprises a first part 40.1 secured to a first element 42.1 and a second part 40.2 secured to a second element 42.2.

In operation, the locking mechanism 40 is configured to occupy a locked state in which the first and second parts 40.1, 40.2 are kept close to one another and an unlocked state in which the first and second parts 40.1, 40.2 can be separated from one another in a longitudinal direction.

In line with at least one of the first and second parts 40.1, 40.2, the first or second element 42.1, 42.2 comprises a wall 44.1, 44.2 separating a first zone and a second zone and having a first face F44.1, F44.2 oriented towards the first zone and a second face F44.1', F44.2' oriented towards the second zone, the first or second parts 40.1, 40.2 being fixed against the first face F44.1, F44.2.

According to one application, the first and second elements 42.1, 42.2 are cowls of a nacelle of an aircraft, the first and second parts 40.1, 40.2 being positioned against the inner face of the cowls of the nacelle. The invention is not limited to this application. According to another application, the first or second element is a moveable element, such as a door or a cowl for example, the other element being fixed. Regardless of the application, the locking mechanism is configured to keep at least one moveable element 42.1, 42.2 in a given position.

Figure 6:
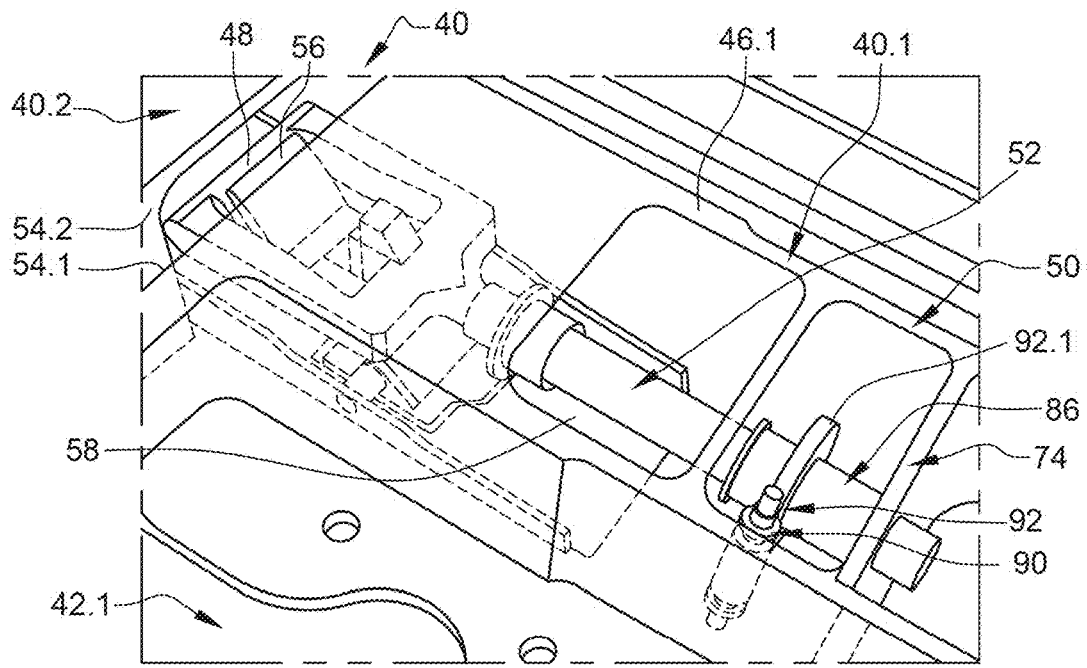
FIG. 6 is a perspective view of a first part of a locking mechanism equipped with an adjustment system illustrating an embodiment of the invention.

According to an embodiment shown in FIGS. 6 and 14, the first part 40.1 comprises a first support 46.1 linked to the first element 42.1, more particularly fixed against the first face F44.1 of the wall 44.1 of the first element 42.1, and an anchoring point 48 linked by a first link 50 to the first support 46.1.

According to one configuration, the anchoring point 48 takes the form of a loop.

According to one arrangement, the first support 46.1 comprises a first rod 52 which extends between first and second ends, the anchoring point 48 being linked to the first end of the first rod 52, the second end of the first rod 52 being linked by the first link 50 to the first support 46.1. The latter comprises a first transverse wall 54.1 (at right angles to the longitudinal direction) close to the second element 42.2.

According to an embodiment shown in FIGS. 6 and 14, the second part 40.2 comprises a second support 46.2 linked to the second element 42.2 and, more particularly, fixed against the first face F44.2 of the wall 44.2 of the second element 42.2, a hook 56 articulated with respect to the second support 46.2 and a handle 58 configured to manipulate the hook 56.

According to one configuration, the hook 56 pivots about a pivoting axis substantially at right angles to the longitudinal direction. The second support 46.2 has a second transverse wall 54.2 (at right angles to the longitudinal direction) close to the first element 42.1, parallel to the first transverse wall 54.1.

The hook 56 and the handle 58 are not described in further detail, as these features can be identical to those of the prior art.

According to another embodiment, the locking mechanism 40 also comprises at least one centering system 60 configured to allow the first and second parts 40.1, 40.2 to be positioned relative to one another in a transverse plane.

According to one configuration, the centering system 60 comprises a second rod 62 linked by a second link 64 to the second support 46.2 and an orifice 66 provided in the first transverse wall 54.1. The orifice 66 is configured to receive the second rod 62 and having a section substantially equal to, or slightly greater than, that of the second rod 62.

In a configuration, the second rod 62 is linked to the first support 46.1 and the orifice 66 is provided in the second transverse wall 54.2.

According to another configuration, the second rod 62 has a pointed first end configured to be housed in the orifice 66, a second end linked by the second link 64 to the second support 46.2 and a collar 62.1 configured to be in contact with the first transverse wall 54.1 away from the first and second ends.

Figure 16:
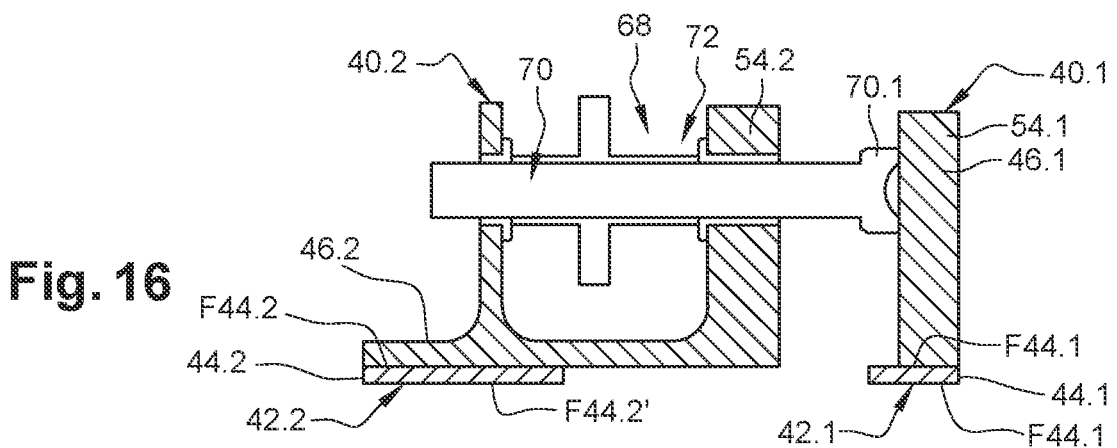
FIG. 16 is a longitudinal cross-section of a shim system equipped with an adjustment system illustrating an embodiment of the invention.
Figure 17:
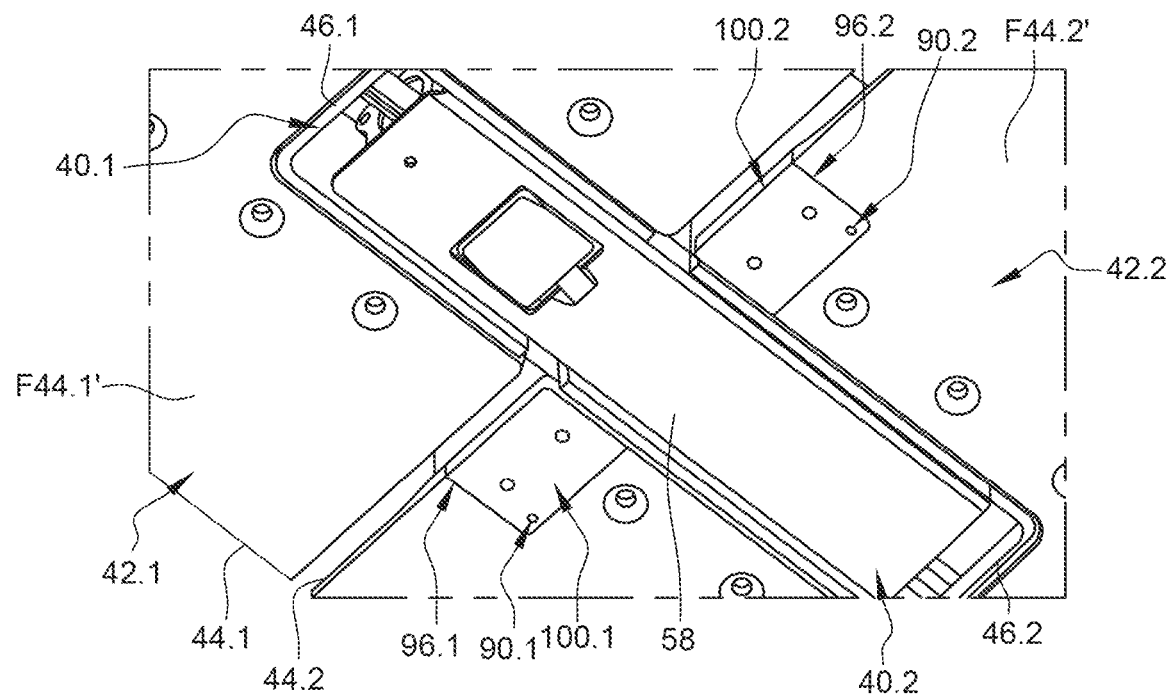
FIG. 17 is a front view of lining and rotation blocking plates in the mounted state illustrating an embodiment of the invention.

According to an embodiment shown in FIGS. 14 and 16, the locking mechanism 40 also comprises at least one shim system 68 configured to make it possible to maintain a given distance between the first and second parts 40.1, 40.2 in the locked state.

According to one configuration, the shim system 68 comprises a third rod 70 which has a head 70.1 at its first end configured to bear against the first transverse wall 54.1 and a second end linked by a third link 72 to the second support 46.2.

In a configuration, the third rod 70 is linked to the first support 46.1 and the head 70.1 is configured to bear against the second transverse wall 54.2.

Figure 7:
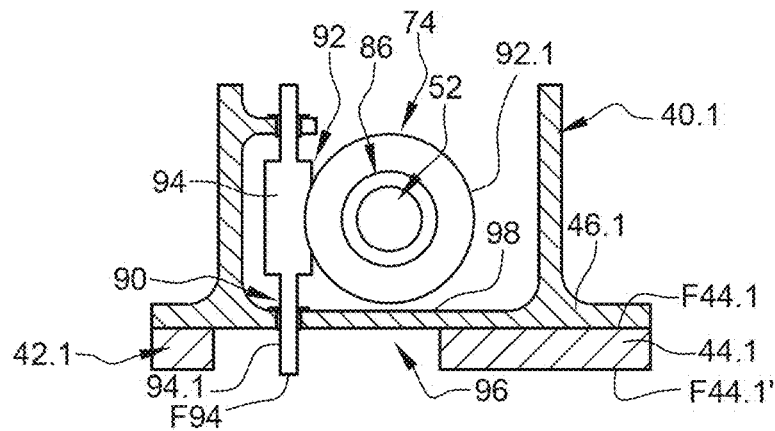
FIG. 7 is a transverse cross-section partially representing an adjustment system of a first part of a locking mechanism illustrating an embodiment of the invention.
Figure 8:
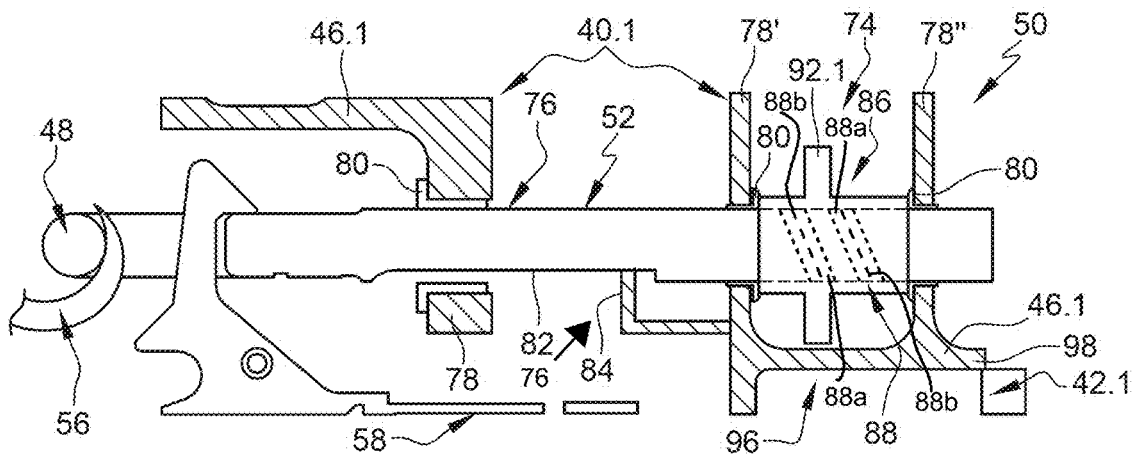
FIG. 8 is a longitudinal cross-section of a first part of a locking mechanism equipped with an adjustment system illustrating an embodiment of the invention.

According to an embodiment shown in FIGS. 6 to 8, the first link 50 linking the anchoring point 48 and the first support 46.1 is configured to allow an adjustment of the position of the anchoring point 48 with respect to the first support 46.1 in the longitudinal direction. To this end, the first link 50 comprises a first adjustment system 74, configured to adjust the position of the anchoring point 48 with respect to the first support 46.1 in the longitudinal direction.

The first link 50 comprises a guideway link 76 linking the first rod 52 and the first support 46.1 and configured to allow the first rod 52 to be translated in a direction parallel to the longitudinal direction.

According to one embodiment, the first rod 52 is linked to the first support 46.1 by a sliding pivot link. Thus, the first support 46.1 comprises at least two transverse wings 78 passed through by the first rod 52. The first rod 52 is cylindrical and the first link 50 comprises guiding rings 80 inserted between each transverse wing 78 and the first rod 52.

According to one arrangement, a transverse wing 78 is positioned at the first end of the first rod 52 and two transverse wings 78', 78", slightly spaced apart, are positioned at the second end of the first rod 52. To obtain a guideway link and to prevent the first rod 52 from pivoting on itself, the first part 40.1 comprises a system for immobilizing rotation of the first rod 52 which comprises a longitudinal groove 82 provided on the first rod 52 and a finger 84 secured to the first support 46.1 that is at least partially housed in the longitudinal groove 82. Other solutions can be envisaged to obtain the guideway link 76.

The first adjustment system 74 comprises a first ring 86 surrounding the first rod 52, a helical link 88 linking the first ring 86 and the first rod 52, a pivoting control 90 which has a first end accessible from the second zone and an angle transmission 92 linking the pivoting control 90 and the first ring 86.

According to an embodiment, the helical link 88 comprises at least one tapping 88a on the inner cylindrical surface of the first ring 86 and at least one threading 88b on the first rod 52, the tapping 88a and the threading 88b being configured to cooperate to obtain the helical link 88.

The pivoting control 90 comprises a first control axle 94 of revolution, linked to the first support 46.1 by a pivoting link, oriented substantially at right angles to the longitudinal direction and comprising a first end 94.1 situated in the second zone or accessible from the second zone.

The angle transmission 92 comprises a crown ring 92.1 secured to the first ring 86, a first toothing provided on the crown ring 92.1 and a second toothing provided on the first control axle 94, the first toothing and second toothing being configured to cooperate to obtain the angle transmission 92.

According to a first arrangement, the first toothing is provided on the cylindrical peripheral face of the crown ring 92.1, the first control axle 94 and the crown ring 92.1 being positioned in a same transverse plane.

According to another arrangement, the first toothing is provided on one of the flat lateral faces of the crown ring 92.1, the first control axle 94 and the crown ring 92.1 being offset in the longitudinal direction.

The first end 94.1 of the first control axle 94 is configured to enable it to pivot on itself. According to a variant, the first end 94.1 has a lateral face provided with at least one flat, such as, for example, a hexagonal section. The invention is not limited to this geometry for the first end 94.1. Thus, the latter can comprise, on its end face F94, a female imprint with a section provided with at least one flat, such as, for example, a hexagonal section. In this case, the first control axle 94 can comprise a cylindrical lateral wall at the first end 94.1.

The second face F44.1' of the wall 44.1 of the first element 42.1 comprises a hollowed form 96 configured to house the part of the pivoting control 90 accessible from the second zone and, more particularly, first end 94.1. Thus, the part of the pivoting control 90 accessible from the second zone does not protrude with respect to the second face F44.1' of the wall 44.1.

According to an arrangement, the pivoting control 90 comprises an end face F94 substantially coplanar with the second face F44.1' of the wall 44.1. This arrangement allows the aerodynamic efficiencies of the aircraft to be unaffected. The hollowed form 96 is dimensioned to allow the pivoting control 90 to be maneuvered easily.

The hollowed form 96 can be blind or extend through, as illustrated in FIG. 7.

According to an embodiment, the first support 46.1 comprises a longitudinal wall 98 pressed against the first face F44.1 of the wall 44.1 of the first element 42.1 and dimensioned to plug the hollowed form 96 when the hollowed form 69 extends through. It comprises a through-orifice to allow the passage of the pivoting control 90, more particularly of the control axle 94.

The locking mechanism 40 comprises a lining plate 100 dimensioned to fill the hollowed form 96 and a rapid attachment system 102 to link the lining plate 100 to the wall 44.1 of the first element 42.1 or to the longitudinal wall 98 of the first support 46.1.

According to a configuration, in the case of a hollowed form 96 that extends through, this lining plate 100 has a first face pressed against the longitudinal wall 98 and a second face flush with the second face F44.1' of the wall 44.1 of the first element 42.1 (so as not to affect the aerodynamic efficiencies of the aircraft) when the lining plate 100 is fixed to the longitudinal wall 98. The rapid attachment system 102 comprises at least one quarter-turn screw to facilitate removal of the lining plate 100.

According to another embodiment, the first adjustment system 74 comprises an anti-return system 104 to block rotation, in at least one direction of rotation, of the pivoting control 90 to immobilize the anchoring point 48 in the adjusted position.

Figure 9:
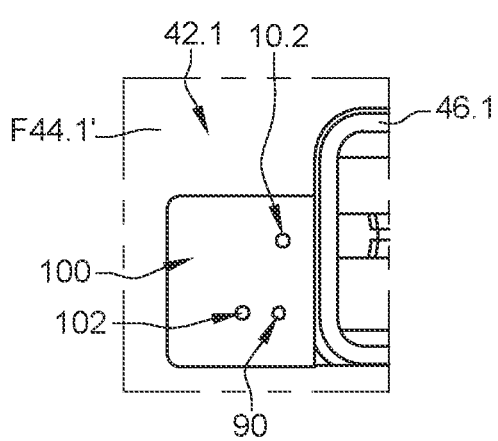
FIG. 9 is a front view of a lining and rotation blocking plate in the mounted state illustrating an embodiment of the invention.
Figure 10:
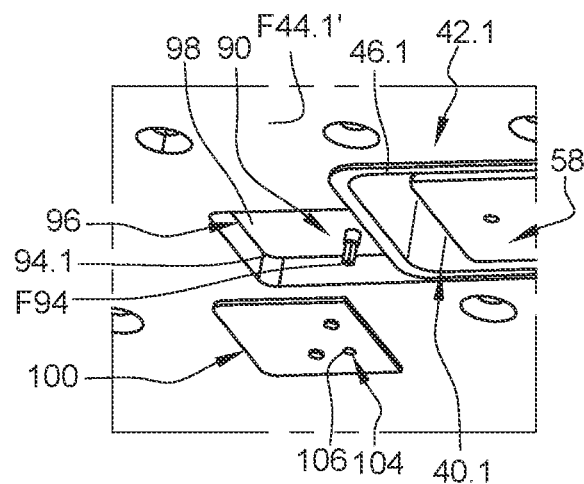
FIG. 10 is a perspective view of the lining and rotation blocking plate visible in FIG. 9 in the removed state.

According to a configuration shown in FIGS. 9 and 10, when the lateral face of the first end 94.1 of the first control axle 94 has at least one flat to make it pivot, the anti-return system 104 comprises a rotation blocking plate comprising a through-orifice 106 having a section identical to that of the first end 94.1 and cooperating therewith, the rotation blocking plate being linked to the first support 46.1. In this configuration, the anti-return system 104 makes it possible to immobilize the pivoting control 90 in both directions of rotation.

Figure 11:
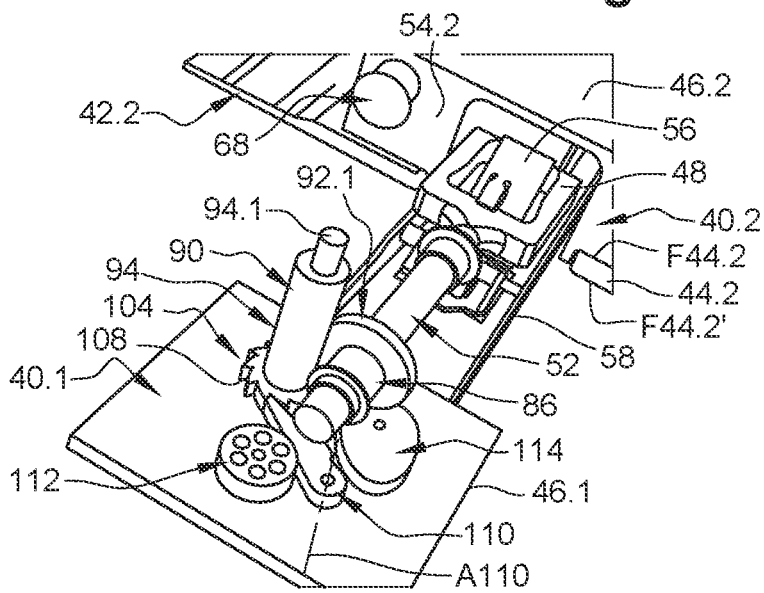
FIG. 11 is a perspective view of an anti-return system illustrating an embodiment of the invention.
Figure 12:
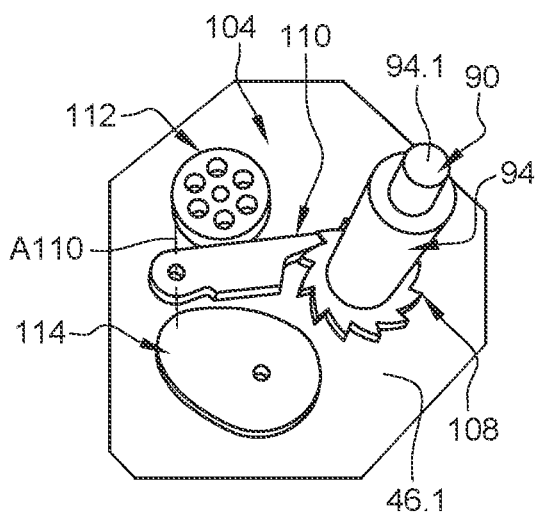
FIG. 12 is a perspective view of the anti-return system visible in FIG. 11 in the activated state.
Figure 13:
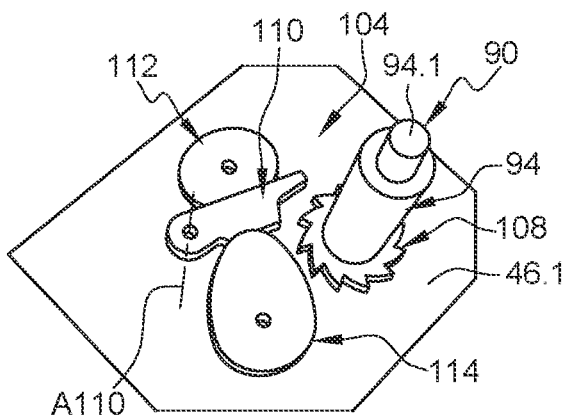
FIG. 13 is a perspective view of the anti-return system visible in FIG. 11 in the declutched state.

According to another configuration shown in FIGS. 11 to 13, the anti-return system 104 comprises a ratchet wheel 108 secured to the pivoting control 90, more particularly to the first control axle 94, a ratchet 110 linked to the first support 46.1 and linked thereto by a pivoting link having a pivoting axis A110 parallel to the first control axle 94, an elastic return element 112 configured to push the ratchet 110 against the ratchet wheel 108 and a control cam 114 configured to separate the ratchet 110 from the ratchet wheel 108 against the elastic return element 112.

According to a configuration, the control cam 114 is linked to a second control axle substantially parallel to the first control axle 94, the second control axle having an end accessible from the second zone. In this configuration, the anti-return system 104 is configured to occupy an activated state (visible in FIG. 12) in which the ratchet 110 cooperates with the ratchet wheel 108 in order to immobilize the pivoting control 90 in one direction of rotation and a declutched state (visible in FIG. 13) in which the ratchet 110 is separated from the ratchet wheel 108 allowing a rotation of the pivoting control 90 in both directions of rotation.

The invention is not limited to the embodiment visible in FIGS. 6 to 8 for the first adjustment system 74.

Figure 18:
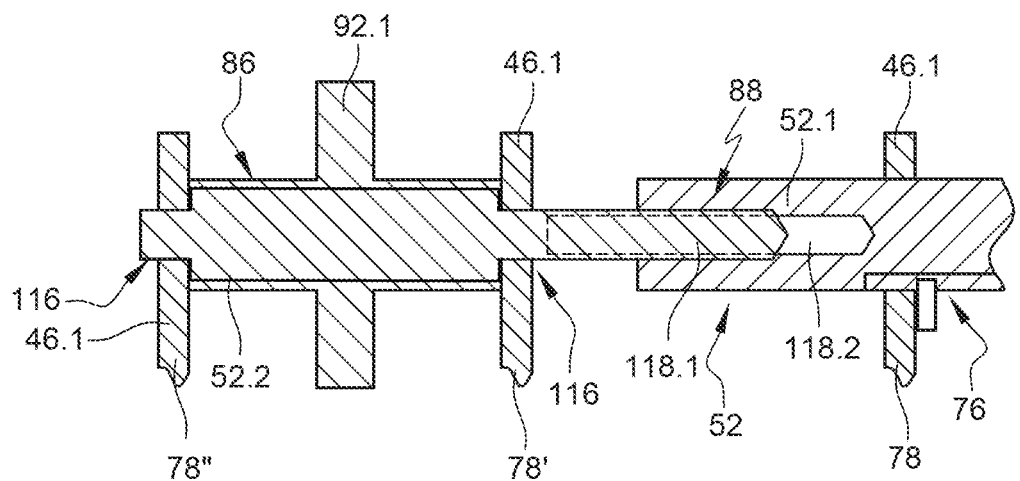
FIG. 18 is a longitudinal cross-section partially representing an adjustment system of an anchoring point of a locking mechanism illustrating another embodiment of the invention.

According to an embodiment shown in FIG. 18, the first rod 52 comprises coaxial first and second segments 52.1, 52.2 and a helical link 88 linking them. The first segment 52.1 is secured to the anchoring point 48 (linked thereto by a rigid link) and linked to the first support 46.1 by a guideway link 76. The second segment 52.2 is linked to the first support 46.1 by a pivoting link 116. In addition, the first ring 86 is secured to the second segment 52.2 and linked thereto by a rigid link.

In FIG. 18, the helical link 88 comprises a first piece out of the first and second segments 52.1, 52.2 which has a first end 118.1 configured to be housed in a hole 118.2 provided at a second end of a second piece, different from the first piece, out of the first and second segments 52.1, 52.2, the first end 118.1 comprising a threading, the hole 118.2 comprising a tapping configured to cooperate with the threading of the first end 118.1 in order to obtain the helical link.

According to one arrangement, the first end 118.1 is provided on the second segment 52.2 and the hole 118.2 is provided on the first segment 52.1.

To obtain the adjustment of the positioning of the anchoring point 48 in the longitudinal direction, the first link 50 linking the first rod 52 and the first support 46.1 and comprising a first segment 52.1 secured to the anchoring point 48 comprises a guideway link 76 allowing at least the first segment 52.1 of the first rod 52 to be translated with respect to the first support 46.1 in a longitudinal direction, an adjustment system 74 having a pivoting control 90 configured to pivot on itself and having a first end accessible from the second zone, an intermediate piece configured to pivot on itself, a helical link 88 configured to convert a pivoting movement of the intermediate piece into a translational movement of at least the first segment 52.1 of the first rod 52, and an angle transmission 92 configured to convert a pivoting movement of the pivoting control 90 into a pivoting movement of the intermediate piece.

According to the embodiment shown in FIGS. 6 to 8, the intermediate piece corresponds to the first ring 86. The angle transmission 92 is configured to convert the pivoting movement of the pivoting control 90 into a pivoting movement of the first ring 86, and the helical link 88 configured to convert the pivoting movement of the first ring 86 into a translational movement of the first rod 52.

According to an embodiment shown in FIG. 18, the intermediate piece is the second segment 52.2 of the first rod 52. The angle transmission 92 makes it possible to convert the pivoting movement of the pivoting control 90 into a pivoting movement of the second segment 52.2, the helical link 88 is configured to convert the pivoting movement of the second segment 52.2 into a translational movement of the first segment 52.1 of the first rod 52.

According to a configuration shown in FIGS. 14 to 17, the centering system 60 and the shim system 68, linked to the second support 46.2, are positioned on either side of the handle 58.

In an embodiment, each of the second and third links 64, 72 linking the centering system 60 and the shim system 68 to the second support 46.2 is configured to allow an adjustment of the positioning of the centering system 60 and of the shim system 68 with respect to the second support 46.2 in the longitudinal direction. To this end, the second and third links 64, 72 each comprise an adjustment system similar to the first adjustment system 74 that makes it possible to adjust the position of the centering system 60 and of the shim system 68 with respect to the second support 46.2 in the longitudinal direction, as illustrated in FIGS. 14 to 17. Thus, the centering system 60 and the shim system 68 comprise distinct pivoting controls 90.1, 90.2 accessible from the hollowed forms 96.1, 96.2 positioned on either side of the handle 58, on the second face F44.2' of the wall 44.2 and filled by removable lining plates 100.1, 100.2.

Regardless of the embodiment, at least one component out of the anchoring point 48, the centering system 60 and the shim system 68 has a positioning that can be adjusted in the longitudinal direction. This adjustable component is linked to the first or second support 46.1, 46.2 by a link 50, 64, 72 which comprises a rod 52, 62, 70 having a first segment 52.1 secured to the adjustable component, a guideway link allowing at least the first segment 52.1 of the rod 52, 62, 70 to be translated with respect to the first or second support 46.1, 46.2 in the longitudinal direction, an adjustment system 74 comprising a pivoting control 90 configured to pivot on itself and having a first end accessible from the second zone, an intermediate piece configured to pivot on itself, a helical link 88 configured to convert a pivoting movement of the intermediate piece into a translational movement of at least the first segment 52.1 of the rod 52, 62, 70, an angle transmission 92 configured to convert a pivoting movement of the pivoting control 90 into a pivoting movement of the intermediate piece.

This arrangement allows the positioning of the adjustable component to be adjusted from the second zone. In the case of the cowls of an aircraft nacelle, it is no longer necessary to alternate the openings and closures of the cowls to adjust the positioning of the anchoring point 48, of the centering system 60 and/or of the shim system 68. This adjustment is thus greatly simplified.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A locking mechanism, comprising:
first and second parts and configured to occupy a locked state in which the first and second parts are kept close to one another by a hook and an anchoring point, and an unlocked state in which the first and second parts are configured to be separated from one another in a longitudinal direction,
the first part being configured to be fixed onto a first element comprising a wall separating a first zone and a second zone, the first part being situated in the first zone and comprising a first support fixed against the wall in operation,
the first part comprising at least one adjustable component having a positioning that is configured to be adjusted in the longitudinal direction and that is linked to the first support by a link comprising a rod which comprises a first segment secured to the at least one adjustable component;
wherein the link comprises:
a guideway link configured to allow at least the first segment of the rod to be translated with respect to the first support in the longitudinal direction, and
an adjustment system comprising:
a pivoting control configured to pivot, passing through the wall and having a first end accessible from the second zone in operation;
an intermediate piece configured to pivot,
an angle transmission configured to convert a pivoting movement of the pivoting control into a pivoting movement of the intermediate piece,
a helical link configured to convert the pivoting movement of the intermediate piece into a translational movement of at least the first segment of the rod, and
an anti-return system configured to block rotation of the pivoting control in at least one direction of rotation, wherein the anti-return system comprises a ratchet wheel secured to the pivoting control, a ratchet linked to the first support by a pivoting link, an elastic return element configured to push the ratchet against the ratchet wheel and a control cam configured to separate the ratchet from the ratchet wheel against the elastic return element.
2. The locking mechanism of claim 1,
wherein the intermediate piece is a first ring positioned around the rod and comprising an inner cylindrical surface, and
wherein the helical link comprises at least one tapping on the inner cylindrical surface of the first ring and at least one threading on the rod, the tapping and the threading being configured to cooperate in order to obtain the helical link, the angle transmission configured to convert the pivoting movement of the pivoting control into a pivoting movement of the first ring.

3. The locking mechanism of claim 1,
wherein the rod comprises a second segment coaxial to the first segment, and
wherein the intermediate piece comprises the second segment of the rod, the angle transmission configured to convert the pivoting movement of the pivoting control into a pivoting movement of the second segment, the helical link configured to convert the pivoting movement of the second segment into the translational movement of at least the first segment of the rod.

4. The locking mechanism of claim 1, wherein the locking mechanism further comprising:
at least one centering system configured to allow the first and second parts to be positioned with respect to one another, and
at least one shim system configured to maintain a given distance between the first and second parts in the locked state.

5. An aircraft, comprising:
at least one movable element comprising the wall separating the first zone and the second zone and having a first face oriented towards the first zone and a second face oriented towards the second zone, and
at least one locking mechanism of claim 1 positioned in the first zone and configured to keep the movable element in a given position in the locked state.

6. The aircraft of claim 5, wherein the second face of the wall comprises, for the pivoting control, a hollowed form configured to house a part of the pivoting control accessible from the second zone, said pivoting control comprising an end face substantially coplanar with the second face of the wall.

7. The aircraft of claim 6, wherein the locking mechanism comprises, for the hollowed form, a lining plate dimensioned to fill the hollowed form and a rapid attachment system configured to link the lining plate to the wall, the lining plate having a face flush with the second face of the wall when the lining plate is linked to the wall.

8. The aircraft of claim 6, wherein the locking mechanism comprises, for the hollowed form, a lining plate dimensioned to fill the hollowed form and a rapid attachment system configured to link the lining plate to a support of the locking mechanism, the lining plate having a face flush with the second face of the wall when the lining plate is linked to the support.

* * * * *